UNITED STATES PATENT OFFICE 2,462,640

METHOD OF MAKING METHYL SILOXANES

James Franklin Hyde, Corning, N. Y., assignor to Corning Glass Works, Corning, N. Y., a corporation of New York No Drawing. Application April 17, 1944, Serial No. 531,498

1 Claim. (Cl. 260—448.2)

This invention relates to new compositions of matter and their preparation and, more particularly, to methyl-siloxanes and methods of preparing them.

This application is a continuation-in-part of my copending applications Serial Number 432,528, filed February 26, 1942, and Serial Number 467,146 filed November 27, 1942, now Patent No. 2,456,783.

Methyl-substituted silanes of the formula $CH_3SiX_3$ are prepared by means of the well-known Grignard reaction, where each X is a hydrolyzable radical such as hydrogen, halogens, alkoxy, aroxy, acyloxy, etc. By hydrolyzable radical is meant, in general, any radical which is attached to silicon by other than carbon-silicon linkage and which under the same set of conditions is more readily hydrolyzed than a methyl radical directly attached to silicon through carbon-silicon linkage. Such methyl-substituted silanes are hydrolyzed on treatment with water to form, not a simple hydroxy compound but a partially dehydrated product having a network of siloxane linkages as a result of the concurrent or subsequent loss of water from the intermediately formed hydroxy compound.

Type I

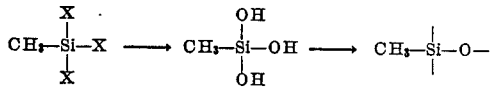

The formation of a siloxane linkage generally results from the close approach of two hydroxyl groups and subsequent elimination of water. It may also result from the close approach of one hydroxyl group to a hydrolyzable group such as halogen, acyloxy or alkoxy and subsequent elimination of hydrogen halide, carboxylic acid or alcohol, respectively. Such eliminations are catalyzed by mineral acids, especially hydrochloric and sulfuric, and by alkali metal hydroxides, especially sodium hydroxides. It will be seen that in each of the above structural units one of the four silicon bonds is blocked by a methyl radical, and only three siloxane linkages can form. Such compounds are capable of three-dimensional polymerization.

The products obtained by the hydrolysis of $CH_3SiX_3$ are in general gel-like substances which are brittle and insoluble. It is possible, however, by proper selection of hydrolysis conditions to produce only partially dehydrated materials which are soluble and thermoplastic resins but extreme care must be exercised since they are readily dehydrated to the insoluble and brittle stage.

Methyl-substituted silanes of the formula $(CH_3)_3SiY$ may also be prepared by the Grignard reaction where Y is a hydrolyzable radical such as X defined above. When these silanes are hydrolyzed and dehydrated, they yield simple oxides in the structural unit of which three of the four silicon bonds are blocked by the methyl radicals.

Type II

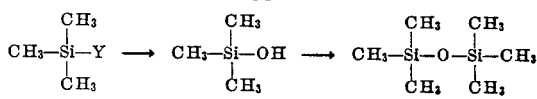

In this case, ease of hydrolysis is further diminished and in some cases the intermediate hydroxy silanes can be isolated. The completely dehydrated product is dimeric because only one siloxane linkage can be formed. Hexamethyldisiloxane is a liquid of low viscosity which can not be further polymerized.

Prior attempts to utilize the above-described reactions have not contemplated combinations thereof, but have been confined to the individual reactions and their products. Such products, as shown above, have limited utility and the range of properties obtainable in the products of a given type of reaction is relatively restricted.

An object of this invention is the production of new and useful products from these reactions which will have desirable predetermined properties.

Another object is to combine the above-described reactions and thus to inter-condense the hydrolysis products of at least one mono-methyl substituted mono-silane and at least one tri-methyl-substituted mono-silane.

Another object is to produce liquid products of varying viscosity.

Another object is to produce thermoplastic resinous products.

Another object is to produce thermosetting resinous products.

A further object of the present invention is to prepare methyl-siloxanes which contain silicon atoms having one and three methyl radicals respectively attached thereto through carbonsilicon linkages.

The new method comprises mixing together at least one compound of each of the types $CH_3SiX_3$ and $(CH_3)_3SiY$ where X and Y, are the same or different hydrolyzable radicals attached to silicon by other than carbon-silicon linkages, and causing them to hydrolyze together and to become inter-condensed. It is to be understood that each of the silanes is present in appreciable quantity, i. e., in amount sufficient to produce a perceptible effect on the properties of the resulting inter-condensate. One method of accomplishing inter-condensation is by introducing into the mixture by dropwise addition thereto the amount of water which is calculated for complete hydrolysis of the mixture and which is dissolved in from two to four volumes of a common solvent such as alcohol, dioxan, acetic acid, acetone, etc. The use of a water miscible solvent for diluting the hydrolyzable mixture or the water or both and the dropwise addition of the water insures the maintenance of homogeneity during hydrolysis. Under these conditions condensation or the formation of siloxane linkages occurs concurrently with the hydrolysis, but it is to be understood that the extent of further subsequent dehydration is optional and will depend largely upon the use to which the product will be put. Hydrolysis and dehydration of the above mixture of mono-silanes result in inter-condensation or formation of interconnecting oxygen linkages between the silicon atoms of the various silanes.

If the hydrolyzable group or groups of all of the silanes in the mixture to be hydrolyzed are halogens, it is preferable to employ dioxan as the solvent because it is inert to the halogens. If the mixture contains both halogens and alkoxy groups the former can be converted to the latter by the slow addition of dry alcohol to the mixture, or the mixture can be diluted with dioxan and treated with aqueous alcohol. When the mixture contains only alkoxy groups any water miscible solvent may be used together with a trace of acid such as HCl as catalyst. In this case, alcohol may be preferred on account of its relatively low cost. Mixtures of water miscible solvents may be used.

In the above-described method, the slow incorporation of water into the homogeneous solution insures that hydrolysis is not permitted to proceed unchecked, whereby the more reactive silane would be more completely hydrolyzed and condensed before the less reactive have had an opportunity to react. On the contrary, the less reactive silanes are thus given a greater opportunity to hydrolyze simultaneously with the more reactive silanes than would be the case if the hydrolysis were conducted rapidly. Under these circumstances, simultaneous condensation of the various intermediate hydroxy compounds takes place and an intimate inter-molecular combination through siloxane linkages of silicon atoms bearing different numbers and kinds of organic radicals becomes possible to the fullest extent. This insures a true inter-condensation with the formation of homogeneous products containing mixed unit structures.

After removal of solvent and excess water the hydrolysis products resulting from the above process are water-immiscible liquids of varying viscosity. They are soluble in the common organic solvents such as benzene, toluene, etc. Many of them are thermoplastic, some are thermosetting, and some are thermally stable liquids. Further condensation and polymerization may be brought about by heating, which generally results in an increase in viscosity and in some cases, if carried to completion, results in resinous solid products. The desired degree of polymerization will depend largely upon the contemplated use of the product and may be varied at will, since the final physical properties depend directly on the total number of siloxane linkages per molecule and the disposition of the siloxane linkages, this being controlled by the relative amounts of the various types of silanes initially present.

The partially dehydrated methyl-siloxanes or hydrolysis products, after removal of solvents, are generally liquids of various viscosities and they vary in the extent to which dehydration has occurred at this stage. The ease of dehydration and the physical properties of the partially condensed methyl siloxanes vary with the final ratio of oxygen to silicon. Subsequent heating is usually necessary for complete dehydration.

The methyl-siloxanes which are produced by my method may be represented as combinations of the units

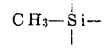

and $(CH_3)_3Si—$, bearing in mind that these units are chemically combined with each other by siloxane linkages, that the percentage of each unit may be varied at will, and that the properties of the resulting products will show corresponding variations which can be predicted in making compositions for a particular purpose. It is also to be understood that the units may be joined in a multiplicity of ways to form chain and cyclic structures and combinations thereof.

The following examples will illustrate the mode of operation of the process and the character of the resulting products.

*Example 1*

A mixture of 7.12 grams of methyl-triethoxy-silane and 1.18 grams of trimethylethoxysilane was prepared. Both of the silanes were prepared by the action of methylmagnesium chloride on ethyl orthosilicate in accordance with the well-known Grignard reaction. To the mixture of silanes were slowly added 1.98 grams of water dissolved in ethyl alcohol which contained a trace of hydrochloric acid. The alcohol was then distilled off and the resulting product was washed with water and dried. The product was a liquid of medium viscosity. Blowing air through a sample of the product at 250° C. converted it to an extremely viscous liquid that set to a hard but flexible resin after two hours at 250° C. in an aluminum dish.

*Example 2*

A mixture of 80 mol per cent of methyltriethoxysilane and 20 mol per cent trimethylethoxysilane was dropped into half its volume of 2 N hydrochloric acid at such a rate that the temperature remained between 40° and 45° C. The whole hydrolysis solution was then refluxed for 30 minutes. Enough trimethylethoxysilane was added at the conclusion of the refluxing to raise the composition of the mixture to an average of 1.60 carbons per silicon. The entire solution was given another hour of reflux. The solvent (i. e. the alcohol formed as a hydrolysis by-product) was removed by distillation. The product, an oily liquid, was washed and dried. It was then heated at 175° C. for three hours and then at 200° C. until it set to a resinous solid. The heating at 200° C. produced a loss in weight of 6.4%. Further heating at 280° C. for 16 hours resulted in a loss in weight of only 4.1%.

*Example 3*

A mixture of 50 mol per cent of methyltriethoxysilane and 50 mol per cent of trimethylethoxysilane was dropped into half its volume of 2 N hydrochloric acid held at 0° C. The entire mixture was then refluxed for 30 minutes. The methyl siloxane was precipitated as an oily liquid upon the addition of excess water. The liquid was dried and then dissolved in benzene. Refluxing of the benzene solution caused further polymerization. Although the liquid product became increasingly viscous as refluxing continued, it was not possible to gel it. The liquid products from Examples 1 and 2, on the other hand, when refluxed in benzene in similar manner gelled in three and twenty-five hours respectively.

In general, the mono-trimethyl siloxanes of my invention which have a carbon-silicon ratio of less than about 1.6 tend to be resinous in character while those with a higher ratio tend to be permanent liquids. It is to be understood, however, that the conditions under which the hydrolysis of the ester mixtures is carried out also affects the character of the product.

Instead of using the methyl silicon esters as the starting materials as in the above examples, the corresponding halides may be employed if desired, such as methylsilicon trichloride and trimethylsilicon chloride. Or, mixtures of the halides and esters may be used such as methyltriethoxysilane and trimethylsilicon chloride. As previously pointed out the conditions of hydrolysis depend upon the kind or kinds of hydrolyzable radicals present in the starting silanes.

The methyl-siloxanes produced by my method may be adapted to various uses and for any specific use the physical properties and characteristics of the product can be controlled by the proper selection of the initial starting materials so as to obtain the desired carbon to silicon ratio. Products which remain liquid with little or no tendency for further polymerization even at elevated temperatures have good electrical properties whereby they may be used as the liquid filling medium for transformers, circuit breakers, submarine cables, condensers, etc. In general these products have an unusually low coefficient of change of viscosity with temperature and may find use in hydraulic pressure systems which are subjected to wide changes of temperatures or as lubricants for systems of moving parts operating under subnormal or abnormal temperatures.

More viscous liquid products may also be used for lubricants and are particularly useful as damping media in delicate instruments and the like.

Thermoplastic and thermosetting products are useful as molding compounds, film forming coatings, varnishes, impregnating agents for electrical insulation and the like. They may be applied as solutions of the incompletely condensed methylsiloxanes and after evaporation of the solvent can be further polymerized in situ. The more brittle products should be useful embedding media for condenser plates as well as molding compounds.

I claim:

The method which comprises hydrolyzing a mixture consisting of methyltriethoxysilane and trimethylethoxysilane in approximately equimolecular proportions, dehydrating the hydrolysis product and recovering the copolymeric methylsiloxane thereby produced.

JAMES FRANKLIN HYDE.

REFERENCES CITED

The following references are of record in the file of this patent:

UNITED STATES PATENTS

| Number | Name | Date |
| --- | --- | --- |
| 2,258,218 | Rochow | Oct. 7, 1941 |
| 2,371,068 | Rochow | Mar. 6, 1945 |

OTHER REFERENCES

Cusa et al.: J. Chem. Soc. (London), 1932, pp. 2205 to 2209.

Meads et al.: Chem. Soc. (London), 1914, pp. 679 to 690.

Kipping: J. Chem. Soc. (London), 1928, pages 1427 and 1429. (Copy in Scie. Libr.)